United States Patent [19]

Agrawal et al.

[11] Patent Number: 4,758,843
[45] Date of Patent: Jul. 19, 1988

[54] PRINTED, LOW SIDELOBE, MONOPULSE ARRAY ANTENNA

[75] Inventors: Ashok K. Agrawal, Mount Laurel; Walter E. Powell, Cinnaminson, both of N.J.

[73] Assignee: General Electric Company, Moorestown, N.J.

[21] Appl. No.: 873,941

[22] Filed: Jun. 13, 1986

[51] Int. Cl.$^4$ .............................................. H01Q 9/28
[52] U.S. Cl. ............................ 343/814; 343/700 MS; 343/795
[58] Field of Search ............... 343/700 MS, 795, 796, 343/813, 814, 816

[56] References Cited

U.S. PATENT DOCUMENTS

| | | | |
|---|---|---|---|
| 3,587,110 | 6/1971 | Woodward | 343/813 |
| 3,681,769 | 8/1972 | Perrotti et al. | 343/814 |
| 3,747,114 | 7/1973 | Shyhalla | 343/795 |
| 3,887,925 | 6/1975 | Ranghelli et al. | 343/795 |
| 4,021,813 | 5/1977 | Black et al. | 343/786 |
| 4,110,751 | 8/1978 | Reggia et al. | 343/700 MS |
| 4,359,742 | 11/1982 | Smith | 343/768 |
| 4,423,392 | 12/1983 | Wolfson | 343/700 MS |
| 4,575,728 | 3/1986 | Theobald et al. | 343/813 |

FOREIGN PATENT DOCUMENTS

| | | | |
|---|---|---|---|
| 0134804 | 10/1981 | Japan | 343/700 MS |
| 1413041 | 11/1975 | United Kingdom | 343/816 |

OTHER PUBLICATIONS

"Hybrid-Ring Directional Coupler for Arbitrary Power Divisions", by: C. Y. Pon, *IRE Transactions on Microwave Theory and Techniques*, Nov. 1961, pp. 529-535.

"Low-Sidelobe Printed Circuit KU Band Arrays", by A. K. Agrawal and W. E. Powell, *AP-S International Symposium 1985 Antennas and Propagation*, Jun. 17-21, 1985, pp. 731-734.

*Primary Examiner*—William L. Sikes
*Assistant Examiner*—Doris J. Johnson
*Attorney, Agent, or Firm*—Clement A. Berard, Jr.; Raymond E. Smiley

[57] ABSTRACT

A printed circuit dipole monopulse antenna includes a planar printed circuit substrate having a plurality of dipole antennas and a feed network including a sum and difference hybrid printed thereon. Low sidelobe and monopulse operation are provided along one axis of the antenna.

12 Claims, 2 Drawing Sheets

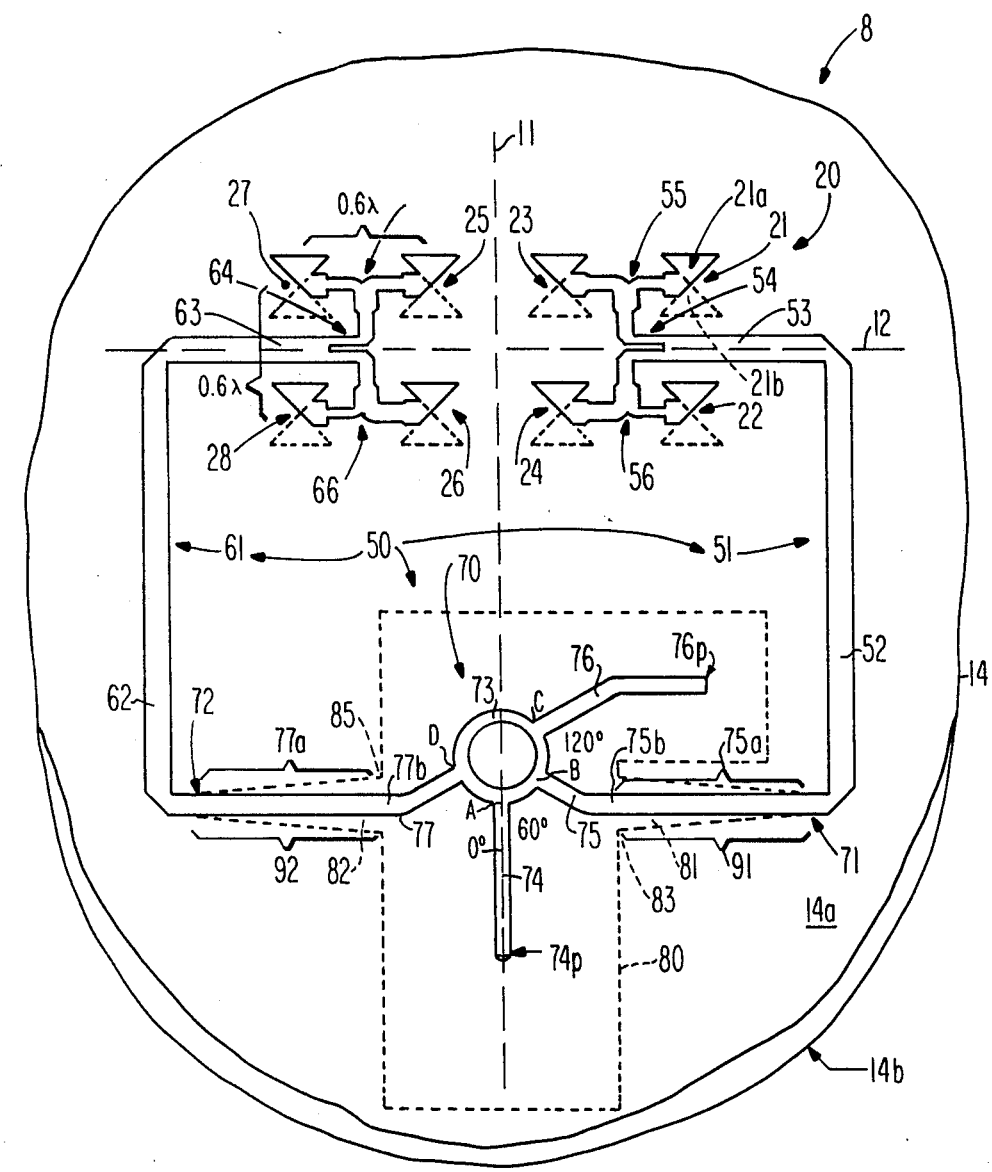
*Fig. 1* (FRONT VIEW)

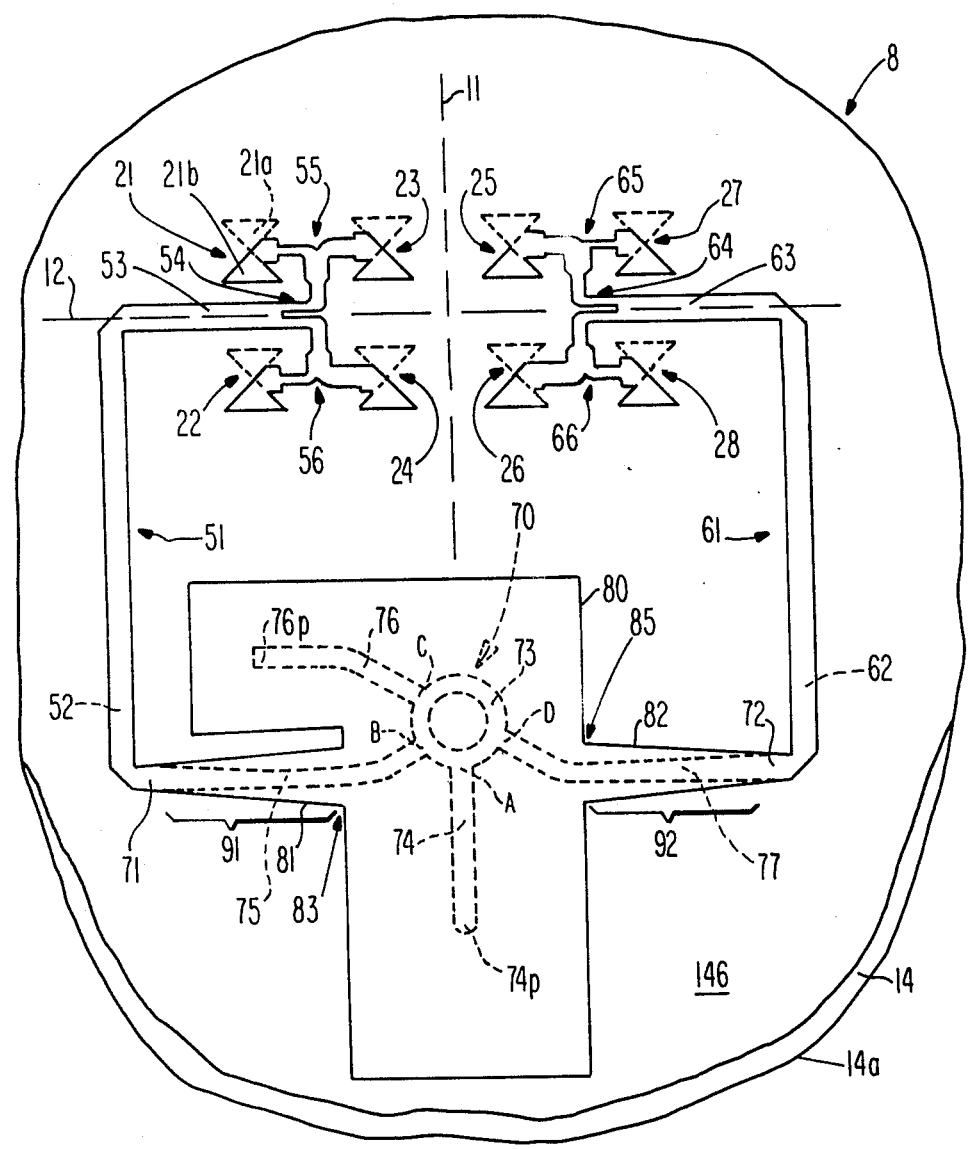
Fig. 2 (BACK VIEW)

PRINTED, LOW SIDELOBE, MONOPULSE ARRAY ANTENNA

STATEMENT OF GOVERNMENT RIGHTS

The government has rights in this invention pursuant to Contract No. DAAK20-84-C-0142 awarded by the Department of the Army.

RELATED APPLICATION

Our related, commonly assigned patent application entitled, "Non-planar Aperture Antenna and Switching System Therefore", Ser. No. 873,942 is being filed herewith on June 13, 1986. That Application is incorporated herein by reference.

BACKGROUND OF THE INVENTION

This invention relates to the field of printed antennas and more particularly to the field of printed array antennas.

Printed circuit antennas are utilized at high microwave frequencies such as the Ku-band to provide compact light weight antennas. Planar printed array antennas are known in which a plurality of dipole antennas are distributed in a rectangular array on a substrate and fed through a feed network which provides equal amplitude and phase signals to each of the dipole antennas. U.S. Pat. No. 3,587,110 to Woodward which is assigned to the present assignee is an example of such an antenna structure and is incorporated herein by reference. Such antennas are also known which incorporate phase shifters within the feed network. U.S. Pat. No. 3,887,925 to Ranghelli et al. is an example of such a structure.

U.S. Pat. No. 3,474,114 to Shyhalla discloses a planar array dipole antenna having equal phase and amplitude drive signals in which the feed network is disposed on one side of a substrate and the individual dipole antennas are disposed on the other side of the substrate. This antenna includes separate feed connections for the two (left and right) halves of the antenna.

A need has developed for a flat printed circuit dipole array antenna which operates in a monopulse mode. Unfortunately, the existing printed dipole array antennas in order to operate in a monopulse mode require the addition of sum and difference circuitry off the substrate. Provision of such off-substrate sum and difference circuitry destroys the planar nature of the antenna and may significantly increase weight depending on the type used.

Thus, a printed monopulse array antenna is needed which includes sum and difference circuitry on the printed substrate.

SUMMARY OF THE INVENTION

An RF antenna printed circuit structure comprises a dielectric substrate having a plurality of printed radiating elements and a printed feed network thereon. The radiating elements are disposed in an array which is symmetric with respect to a line of symmetry. The feed network includes a printed sum and difference hybrid disposed on the substrate and connected to the radiating elements by two printed transmission line feed sections. The hybrid has a sum port, a difference port, and two antenna ports for providing signals at the antenna ports which are in phase with each other when the hybrid is driven from the sum port and which are 180° out of phase when the hybrid is driven from the difference port. One of the printed transmission line feed sections is coupled between one of the hybrid's antenna ports and each of the radiating elements disposed on one side of the line of symmetry. The other printed transmission line section is coupled between the hybrid's other antenna port and each of the radiating elements disposed on the other side of the line of symmetry.

BRIEF DESCRIPTION OF THE DRAWINGS

FIG. 1 is a front plan view of a monopulse phased array antenna in accordance with the present invention; and FIG. 2 a back plan view of the monopulse phased array antenna in FIG. 1.

DETAILED DESCRIPTION OF THE PREFERRED EMBODIMENT

In FIG. 1 a printed monopulse phased array antenna in accordance with the present invention is illustrated generally at 8 in front plan view. The same antenna is shown in back plan view in FIG. 2. In both FIGURES conductors which are behind the substrate and not aligned with the conductors which are in front of the substrate are shown in phantom.

This antenna is designed to provide a low sidelobe beam pattern having a 3dB beamwidth in azimuth of 2320 (along horizontal axis 12 in FIG. 1). The antenna provides a 3dB beam width in elevation (along vertical axis 11 in FIG. 1) which is about 40°. To provide these characteristics, the antenna 8 comprises, formed on a printed circuit substrate 14, a 2×4 dipole array 20 and a monopulse antenna azimuth feed network 50. The 2×4 dipole array 20 is comprised of eight identical printed, bow-tie, dipoles 21–28. The array 20 is disposed in a manner which is symmetric about both vertical axis 11 and horizontal axis 12 which are lines of symmetry for the array. The dipoles 21–24 form a cluster to the right of vertical axis 11 and dipoles 25–28 form a cluster to the left of the vertical axis 11 in FIG. 1. The odd-numbered dipoles are disposed above the axis 12 and the even-numbered dipoles are disposed below the axis 12. To provide the antenna with the desired beam pattern, adjacent dipoles are separated in both the horizontal and the vertical directions by a common distance of 0.6 wavelength in air at a design frequency.

The 2×4 array 20 is oriented with its four dipole dimension along the azimuth axis 12. Low sidelobe operation is further provided by an amplitude tapering of the illumination provided by the feed network 50 to the dipoles along that axis. This taper provides each of the four dipoles (23–26) adjacent to axis 11 with an amplitude level which is 1.6 times the level at each of the four dipoles (21, 22 and 27, 28) which are remote from axis 11. Uniform illumination is provided in elevation because the array is only two dipoles high in the elevation direction and a low sidelobe pattern is not needed in elevation.

The feed network 50 is a corporate feed network which as shown in FIG. 1 includes a sum and difference hybrid 70 and right and left sections 51 and 61 which extend therefrom. Sections 51 and 61 are disposed on opposite sides of axis 11 and separately feed the dipoles on their respective sides of that axis in order to provide the desired monopulse signals in the azimuth direction (parallel to the horizontal axis 12). A corporate feed network is a transmission line feed network in which the electrical length of the transmission line from the common port of the feed network to the radiating element is the same for each radiating element. Thus, all of the radiating elements are driven in phase. The equal length lines to the radiating elements yield a maximum bandwidth since the lengths of the transmission lines relative to each other do not change with frequency. Each section 51, 61 of this corporate feed network comprises a binary tree of power dividers which connects from the hybrid 70 to each of the dipoles 21–24 and 25–28, respectively, on its side of axis 11. A binary tree is a structure with a trunk or main line which repeatedly branches (divides) in two at each branching point until the terminal branches or leaves are reached.

The sections 51 and 61 are symmetric to each other about the vertical axis 11 of the array 20. Each section 51, 61 of the feed network is a binary tree which has a leaf coupled to each dipole in its half of the array and has its trunk coupled to the printed hybrid 70 through a corresponding antenna port 71 or 72, respectively. In this feed network, each of the branching points in the tree is a one-to-two power divider whose common line is the trunk or main branch at that branching point. In this embodiment, these power dividers are connected to each other and the dipoles by balanced transmission lines. Uniform amplitude illumination in elevation is provided by the combination of hybrid 70 which provides equal power to each half of the antenna and the primary (first) power divider (54 or 64) in each tree. Both of the primary power dividers are equal-power power dividers which divide that power evenly between upper (odd-numbered) and lower (even-numbered) dipoles. Each of these primary power dividers 54 and 64 has its common transmission line 53 or 63, respectively, disposed along the horizontal axis 12 of the antenna. The branch lines of each of these primary power dividers extend perpendicular to that divider's common transmission line 53 or 63. These branch lines are oriented parallel to the verical axis 11 of the antenna system. Each of these primary power divider branch transmission lines is coupled directly to the common transmission line of a secondary power divider. The tapered amplitude illumination in azimuth is provided in tree 51 by secondary power dividers 55 and 56 and in tree 61 by secondary power dividers 65 and 66 each of which provides a 4dB power ratio at its branches. Each of these power dividers has both of its branch transmission lines extending parallel to the axis 12 and has its higher power (amplitude) branch extending toward axis 11. This taper provides an antenna beam pattern in the azimuth direction (parallel to the horizontal axis) having a maximum sidelobe level of −20 dB relative to the main beam. Uniform signal phase at all dipoles is provided by the corporate feed network 50 whose transmission path is the same electrical length from each of the dipoles to the ring hybrid 70.

The bow-tie dipole antenna 21 is formed with a first triangular section or wing 21a disposed on a first (front or near in FIG. 1) surface 14a of the substrate 14 and with its second triangular segment or wing 21b disposed on the other (rear or far in FIG. 1) major surface 14b of the substrate 14 (front or near in FIG. 2). In FIG. 1 the wing 21a and its feed conductor are shown in solid lines while the wing 21b is shown in phantom because it is behind the substrate 14. The feed conductor for wing 21b is not visible in FIG. 1 because it is aligned with and directly behind the feed conductor for wing 21a. In FIG. 2, which is the antenna viewed from the other side, the wing 21a is shown in phantom because it is behind the substrate and the wing 21b and its feed conductor are shown in solid lines because they are in front of the substrate in that view. The feed conductor for wing 21a is not visible in FIG. 2 because it is aligned with and directly behind the feed conductor for wing 21b. The wings 21a and 21b are juxtaposed to form the dipole 21. This dipole is fed by a balanced transmission line having two equal-width conductors one of which is disposed on the same substrate surface (14a) as the wing 21a and the other of which is disposed on the same substrate surface (14b) as the wing 21b.

The hybrid 70 comprises a narrow substantially circular, conductor ring 73 and four relatively narrow strip conductors 74–77 which branch therefrom. All of these relatively narrow strip conductors are disposed on the upper substrate surface 14a in FIG. 1. A wide ground plane conductor 80 is disposed on substrate surface 14b which underlies these relatively narrow strip conductors to form a microstrip hybrid ring. In accordance with microwave theory, a microstrip circuit comprises relatively narrow strip conductors disposed on one surface of a dielectric substrate and a relatively wide (at least three times as wide) ground conductor disposed opposite those strip conductors on the opposite surface of that substrate. The ring 73 forms a closed path whose physical size is selected so that the ring is 540 electrical degrees long at the design frequency.

A first end of the relatively narrow strip conductor 74 merges with the ring 73 at a point A which, for reference purposes, is identified as the origin or 0° point of the circle. The second end 74P of strip conductor 74 comprises the sum port of the antenna.

A first end of the strip conductor 75 merges with the ring 73 at a position B which is displaced 60° of arc (90 electrical degrees at the design frequency) in a counter clockwise direction from the conductor 74. The second end of strip conductor 75 merges at port 71 with a strip conductor 52 which in FIG. 1 is the upper surface conductor of the balanced transmission line of the right half section 51 of the feed network. Conductor 75 includes a tapering section 75a which is widest at port 71 and tapers to a narrower width at point 75b. Conductor 75 has a constant width from point 75b to ring 73. A point 83 on the back side of the substrate from point 75b is the point at which a tapering projection 81 of the ground plane conductor 80 merges with the main L-shaped body of that conductor.

A first end of the relatively narrow strip conductor 76 merges with the ring 73 at a position C which is displaced 120° of arc (180 electrical degrees at the design frequency) in the counter clockwise direction from the conductor 74. The second end 76P of strip 76 comprises the difference port of the antenna.

A first end of the relatively narrow strip conductor 77 merges with the ring 73 at a position D which is displaced 300° of arc (450 electrical degrees at the design frequency) in the counter clockwise direction from the conductor 74. The second end of strip conductor 77 merges at port 72 with a strip conductor 62 which in FIG. 1 is the upper surface conductor of the balanced transmission line of the left half section 61 of the feed network. Conductor 77 includes a tapering section 77a which is widest at port 72 and tapers to a narrower width at point 77b. Conductor 77 has a constant width from point 77b to ring 73. A point 85 on the back side of the substrate from point 77b is the point at which a tapering projection 82 of ground plane 80 merges with the main body of the ground plane.

The spacing of the conductors 74–77 along ring 73 causes a signal at the sum port 74P to have the same +90° phase at strip 75 (+450°=+90° clockwise and +90° counter clockwise) as it has at strip 77 (+90° clockwise and +450°=+90° counter clockwise) and to cancel at conductor 76 because the signal propagating clockwise along the ring is 180° out of phase with the signal propagating counter clockwise along the ring (180° counter clockwise and 360° clockwise). Thus, the signals propagating in opposite directions from sum port 74P cancel at difference port 76P and the difference port is isolated from the sum port.

A signal at the difference port 76P is 180° out of phase at strips 75 and 77 (+450°=+90° clockwise or +90° counter clockwise at strip 75) and (270°=−90° clockwise or 270°=−90° counter clockwise at strip 77) and 180° out of phase at sum port 74P (180° clockwise and 360° counter clockwise). Thus, the signals propagating in opposite directions from difference port 76P cancel at the sum port 74P and the sum port is isolated from the difference port. The conductors 75 and 77 are isolated from each other in the same way as the conductors 74 and 76 are. That is, conductors 75 and 77 are separated by 180° electrical degrees along the bottom of ring 73 and by 360° electrical degrees along the top of the ring. The shape of the ring 73 can be changed but the electrical lengths of the separations among the conductors 74–77 should be maintained.

The ground plane 80 disposed on the substrate surface 14b opposite ring 73 and conductors 74–77 has tapering projections 81 and 82 disposed opposite the tapering sections 75a and 77a, of strips 75 and 77, respectively. Ground plane projections 81 and 82 taper in the opposite sense from strip sections 75a and 77a and have their maximum width where they extend at points 83 and 85, respectively, from the main portion of ground plane 80. These ground plane projections taper down to the same width as strips 52 and 62 at ports 71 and 72. At ports 71 and 72 projections 81 and 82 merge with the respective conductors 52' and 62' on surface 14b which are aligned with conductors 52 and 62, respectively to form the balanced transmission lines of the respective feed network sections 51 and 61.

Together, the tapered strip section 75a, the tapered ground plane projection 81 and the substrate 14 form a tapered linear transition balun 91 which connects the hybrid's ring 73 to the balanced transmission line 52 of feed network section 51. This balun transforms the microstrip transmission line impedance to the balanced transmission line impedance of feed network section 51.

Strip section 77a and the tapering ground plane projection 82 (which is similar to projection 81) form a similar linear tapered transition balun 92 which connects the hybrid's ring 73 to the balanced transmission line 62 of feed network section 61. The sum port 74P and the difference port 76P of this antenna may be provided with connectors so that they may be easily connected to off-substrate utilization devices such as receivers and/or transmitters.

The array 8 is provided with a fixed (non-variable) corporate feed network because it is a planar array and the corporate feed results in the radiated signals from all of the dipoles being in phase along a plane parallel to substrate 14. If the array is formed on a curved surface, then a fixed (non-variable) non-corporate feed network is used which compensates for the resulting non-planar aperture of the array so that the signals radiated by all of the dipoles are again in phase along a plane.

If it is desired to provide monopulse processing in both axes, then a second, similar antenna can be provided which is rotated 90° so that its second axis is parallel to the first axis of the antenna 8.

This antenna is easy to make since only two photographic exposures (one for each substrate surface (14a, 14b)) are required to define it on the printed circuit substrate 14. A 0.020 inch Duroid printed circuit board is preferred as the substrate for Ku-band operation.

What is claimed:

1. A printed circuit antenna array comprising:
  a dielectric substrate having first and second opposed major surfaces; opposed major surfaces;
  a plurality of printed radiating elements disposed on said substrate in an array which is symmetric about a first line of symmetry;
  a feed network comprising:
    a printed hybrid disposed on said substrate and having a sum port, a difference port, and first and second antenna ports, said hybrid providing signals at said first and second antenna ports which are in phase with each other when said hybrid is driven from said sum port and which are 180 out of phase when said hybrid is driven from said difference port;
  first and second printed transmission line feed sections, said first section being coupled between said first antenna port of said hybrid and each of said radiating elements which is disposed on a first side of said first line of symmetry, and said second section being coupled between said second antenna port of said hybrid and each of said radiating elements which is disposed on a second side of said first line of symmetry;
  said hybrid comprising:
    a printed ring disposed on said first major surface;
    a first relatively narrow strip conductor disposed on said first surface and extending to said sum port from a reference point on said ring;
    a second relatively narrow strip conductor disposed on said first surface and extending to said first antenna port from a point on said ring which, at a design frequency, is substantially 90 electrical degrees in a first direction from said reference point;
    a third relatively narrow strip conductor disposed on said first surface and extending to said difference port from a point on said ring which at said design frequency is substantially 180 electrical degrees in said first direction from said reference point; and
    a fourth relatively narrow strip conductor disposed on said first surface and extending to said second antenna port from a point on said ring which at said design frequency is substantially 450 electrical degrees in said first direction from said reference point, said reference point being substantially 90 electrical degrees along said ring in said first direction from said fourth relatively narrow strip conductor at said design frequency;
said printed circuit antenna array further comprising:
  a ground conductor disposed on said second major surface of said substrate opposite said hybrid ring and said first through fourth strip conductors whereby said hybrid ring is a microstrip circuit hybrid ring; and wherein:

said first and second feed section each comprise a balanced transmission line and each includes first and second conductors disposed respectively on said first and second major surfaces of said substrate;

said second strip conductor and an opposing section of said ground conductor each taper to form a first linear tapered transistion balun which connects said microstrip hybrid to said balanced transmission line of said first section of said feed network; and said fourth strip conductor and an opposing section of said ground conductor each taper to form a second linear tapered transition balun which connects said microstrip hybrid to said balanced transmission line of said second section of said feed network.

2. The printed array antenna recited in claim 1 wherein:

each of said feed sections comprises a binary tree of power dividers which has its trunk coupled to the corresponding antenna port of said hybrid and has a different leaf connected to each of said radiating elements to which it is coupled.

3. The printed array antenna recited in claim 2 wherein:

each of said radiating elements is a printed dipole.

4. The printed circuit antenna recited in claim 3 wherein there are first through eighth dipoles distributed on said substrate in a 2×4 array with said first through fourth dipoles disposed at the corners of a square located on a first side of said first line of symmetry and said fifth through eighth dipoles disposed at the corners of a square located on a second side of said first line of symmetry and said first, third, fifth and seventh dipoles are disposed in a straight line on a first side of a second line of symmetry which is perpendicular to said first line of symmetry and said second, fourth, sixth and eighth dipoles are disposed in a straight line on a second side of said second line of symmetry and said feed network comprises:

first and second primary power dividers having their common transmission lines coupled respectively, to said first and second antenna ports of said hybrid, and four secondary power dividers each having its common transmission line continuous with a different one of said branch transmission lines of said primary power dividers and having each of its leaves coupled to a different one of said dipoles.

5. The printed circuit array antenna recited in claim 4 wherein:

said secondary power dividers are unequal power dividers; and each of said secondary power dividers has its leaves coupled to two dipoles which are on the same side of said first line of symmetry and at different distances from said first line of symmetry, with its higher power branch transmission line being coupled to the one of said dipoles which is closer to said first line of symmetry to provide a tapered illumination amplitude to said dipoles of said array in a direction parallel to said second line of symmetry.

6. The printed array antenna recited in claim 5 wherein:

each of said primary power dividers has its common transmission line disposed parallel to said second line of symmetry and its branch transmission lines extending parallel to said first line of symmetry.

7. The printed array antenna recited in claim 6 wherein:

each of said secondary power dividers has its branch transmission lines extending parallel to said second line of symmetry.

8. The printed array antenna recited in claim 1 wherein:

each of said radiating elements is a printed dipole.

9. The printed array antenna recited in claim 8 wherein:

each of said dipoles comprises a first conductor disposed on said first major surface of said substrate and a second conductor disposed on said second major surface of said substrate, each connected to the corresponding leaf conductor of said balanced transmission line feed network, said first and second conductors being juxtaposed to form said dipole.

10. The printed array antenna recited in claim 1 wherein:

each of said radiating elements is a printed dipole.

11. The printed array antenna recited in claim 1 wherein:

each of said radiating elements is a printed dipole.

12. The printed array antenna recited in claim 1 wherein:

each of said radiating elements is a printed dipole.

* * * * *